April 21, 1953 L. W. HUSSEY 2,636,133

DIODE GATE

Filed Dec. 1, 1950 3 Sheets-Sheet 1

INVENTOR
L. W. HUSSEY

BY H. A. Burgess

ATTORNEY

April 21, 1953 L. W. HUSSEY 2,636,133

DIODE GATE

Filed Dec. 1, 1950 3 Sheets-Sheet 2

INVENTOR
L. W. HUSSEY
BY H. A. Burgess
ATTORNEY

INVENTOR
L. W. HUSSEY
BY H. A. Burgess
ATTORNEY

Patented Apr. 21, 1953

2,636,133

UNITED STATES PATENT OFFICE 2,636,133

DIODE GATE

Luther W. Hussey, Sparta, N. J., assignor to Bell Telephone Laboratories, Incorporated, New York, N. Y., a corporation of New York Application December 1, 1950, Serial No. 198,688

9 Claims. (Cl. 307—88)

This invention relates to circuits employing circuit-controllers of the voltage-responsive or current-responsive type and especially switching type gates. Switching type gates are so denominated to distinguish them from transmission type gates. A transmission type gate is a device which, when enabled by one or more suitable controls, will permit a more or less accurate replica of a signal impressed on its input to appear at the output. When a transmission gate is disabled, the impressed signal will be blocked. An example of a transmission type gate is disclosed, for example, in a copending application of W. D. Lewis, Serial No. 122,765, filed October 21, 1949 now patent No. 2,535,303. The switching type gate functions in a different manner and serves to switch a current of fixed magnitude into a load under the control of one or more control voltages. Outside a transition region, the output wave form has no necessary resemblance, except in duration, to that of the control. In some applications the amplitude and wave form of the output signal is important; the transmission type gate is indicated for such use. But there are many applications where it is merely the presence or absence of a pulse in the output that is required, such as in computers and pulse transmission systems. In these latter applications, the switching type gate is not only adequate but preferable, as will be explained.

It is the object of the invention to switch a substantially fixed current into a load circuit upon a predetermined coincidence, non-coincidence or combination thereof, of input control voltages.

Another object is to gate a signal into a load circuit without producing a "pedestal" for the signal.

A further object of the invention is to gate a fixed signal into a load circuit when enabling signals are impressed on certain of the control inputs and to prevent a signal from being gated to the load when inhibiting signals are impressed on certain of the control inputs.

Another object of the invention is to gate a fixed signal into a load circuit when signals are received on either one of two control inputs but to prevent a signal from being gated to the load when signals are coincidentally applied to the two inputs.

It is also an object of the invention to make allowance for slight inaccuracies of predetermined magnitude, in the timing, of the control signals whose coincidence or non-coincidence is determinative of the signal appearing at the output of the gating device.

Another object is to define a nominal time interval during which the presence or absence of control inputs is to be determinative of the presence or absence of an output for the device.

To illustrate the invention, its principle, features and objects, there will be described in detail below switching type gates of both the coincidence and anti-coincidence type. A coincidence gate has two or more inputs and switches a fixed current to the load only when enabling signals are simultaneously applied to all enabling controls. Inhibiting controls may also be included and then the current will be switched to the load only if enabling voltages are present on all enabling controls and if no inhibiting voltages are present on any of the inhibiting controls. An anti-coincidence circuit has two or more inputs and produces an output only when a voltage is applied to only one input at a time.

The current switched to the load upon a desired coincidence, non-coincidence or combination thereof is supplied from a fixed source and hence bears no relation, other than in time, to the input voltage. As a result, one of the chief disadvantages of the transmission type gate is avoided, namely, the signal switched to the load has no pedestal due to the control signals themselves. Further, the output pulse or voltage will have a standard amplitude and will not vary with the amplitudes of the control pulses.

Accurate coincidence of the control signals can be difficult or impossible of attainment in certain applications, for example, in many pulse transmission systems. In accordance with another principle of the invention, also described below in detail with reference to specific illustrative embodiments, this difficulty is overcome by defining a "coincidence" interval which is greater than merely the durations of the control signals themselves. The presence or absence of the control signals within this defined interval, rather than exact coincidence or non-coincidence, is then determinative of the character of the output.

Other principles, features and objects of the invention may be better understood by a consideration of the following detailed description when read in accordance with the attached drawings, in which.

Figure 1:
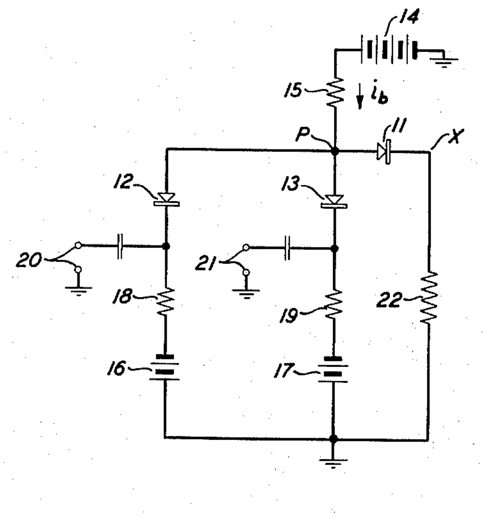
Figs. 1, 2 and 3 are circuit schematics of switching type coincidence gates embodying principles of the invention.

Referring now to Fig. 1, a simple two-control switching type coincidence gate comprises three asymmetrically conducting devices 11, 12 and 13 connected to a junction $p$ by like electrodes. The asymmetrically conducting devices may, for example, comprise germanium crystal diodes or vacuum tube diodes and in any event present a high impedance when biased with one polarity and a low impedance when biased with the opposite polarity. For descriptive purposes herein, the asymmetric devices will be referred to as diodes. A high impedance or constant current bias source comprising battery 14 and resistor 15 is also connected to the junction $p$. The electrodes of diodes 12 and 13, other than the ones connected to the junction $p$, are biased negative with respect to the junction by batteries 16 and 17 which are connected to their respective diodes by resistors 18 and 19. Diodes 12 and 13 are thus, in the absence of input signals, biased in their low resistance or conducting condition. Resistor 15 is large relative to resistors 18 and 19 so that point $p$ will be negative with respect to point $x$ and diode 11 is biased in its high resistance condition or non-conducting. Therefore, with no voltage applied to control inputs 20 or 21, the current $i_b$ from battery 14 divides between diodes 12 and 13 and the load resistor 22 is isolated from battery 14 by diode 11.

If a positive voltage such as a positive pulse is applied to control input 20, and if this voltage is of sufficient magnitude to bias diode 12 non-conducting, the current $i_b$ will flow entirely through diode 13 and resistor 19. The potential of point $p$ will rise due to the increased drop across resistor 19 but if the voltage of battery 17 is sufficiently large, and more specifically, if:

$$E_{17} < -R_{19}\, i_b$$

where, $E_{17}$=terminal voltage of battery 17, and
$R_{19}$=the resistance of resistor 19;

point $p$ will remain negative with respect to point $x$ and hold diode 11 non-conducting. Likewise, if:

$$E_{16} < -R_{18}\, i_b$$

where, $E_{16}$=the terminal voltage of battery 16, and,
$R_{18}$=the resistance of resistor 18;

point $p$ will remain negative if diode 12 remains conducting and even though diode 13 is biased non-conducting by the application of a positive pulse to control input 21.

It may readily be seen that if positive pulses are simultaneously applied to control inputs 20 and 21, so that diodes 12 and 13 are simultaneously rendered non-conducting, the current $i_b$ will flow through load resistor 22 giving the gate an output of magnitude $i_b R_{22}$ where $R_{22}$ is the resistance of resistor 22. The magnitude of the output bears no relation to the inputs at terminals 20 and 21 as long as the input voltages are sufficiently large to hold diodes 12 and 13 non-conducting, which requires that:

$$E_{20} \text{ and } E_{21} > +R_{22}\, i_b$$

where, $E_{20}$ and $E_{21}$ are, respectively, the potentials across terminals 20 and 21.

The circuit as shown in Fig. 1 is a coincidence or *AND* gate with two enabling inputs. To operate the gate with negative enabling voltages, it is necessary merely to reverse the poling of the diodes 11, 12 and 13 and batteries 14, 16 and 17. The output, upon coincidence, would then be a negative pulse.

Figure 2:
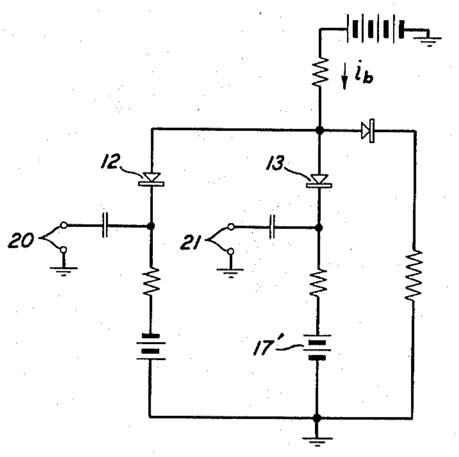

Referring to Fig. 2, one of the controls can be made an inhibiting control by reversing the polarity of one of the diode biases, e. g. battery 17, so that diode 13 is normally non-conducting. With the circuit of Fig. 2, a positive pulse applied to terminal 20 will give the gate an output if no signal is simultaneously applied to terminals 21. If a negative pulse of sufficient magnitude to render diode 13 conducting is applied to terminals 21, the gate will have no output even though a positive pulse is applied to terminals 20.

Figure 3:
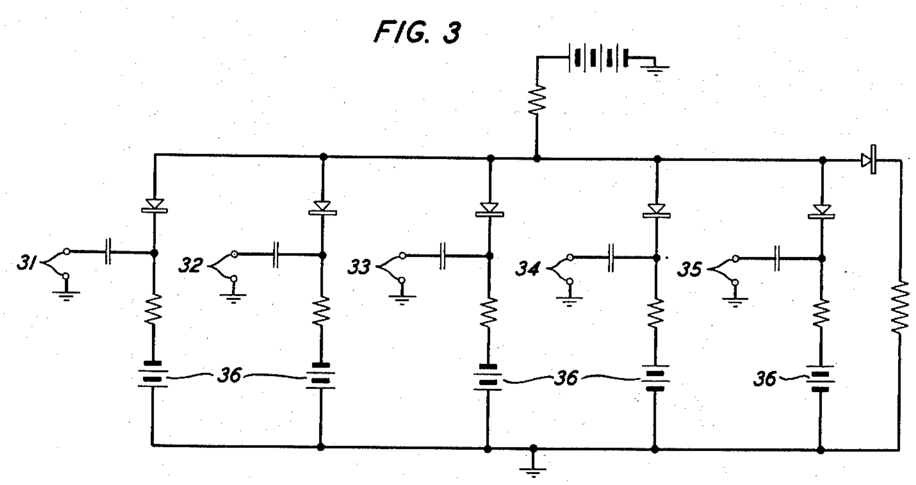

The gates of Fig. 1 or 2 may be expanded in an obvious manner to be responsive to more than two controls. Either enabling or inhibiting controls may be added as is illustrated by Fig. 3. Control terminals 31, 32 and 33 are enabling controls and terminals 34 and 35 are inhibiting controls due to the poling of diode biasing batteries 36. The gate will therefore have an output only when positive pulses are simultaneously applied to terminals 31, 32 and 33 and if no negative pulses are at the same time applied to either terminal 34 or 35. The diodes and batteries may be reversed as previously explained to accommodate control pulses of the opposite polarity.

An anti-coincidence or "And Not" gate has two or more inputs. It produces an output when a single enabling signal is impressed on either input but no output when there is no input or where there are two coincident inputs. This type of gate is employed, for example, in the usual serial adder and may be employed in pulse code translators.

Figure 4:
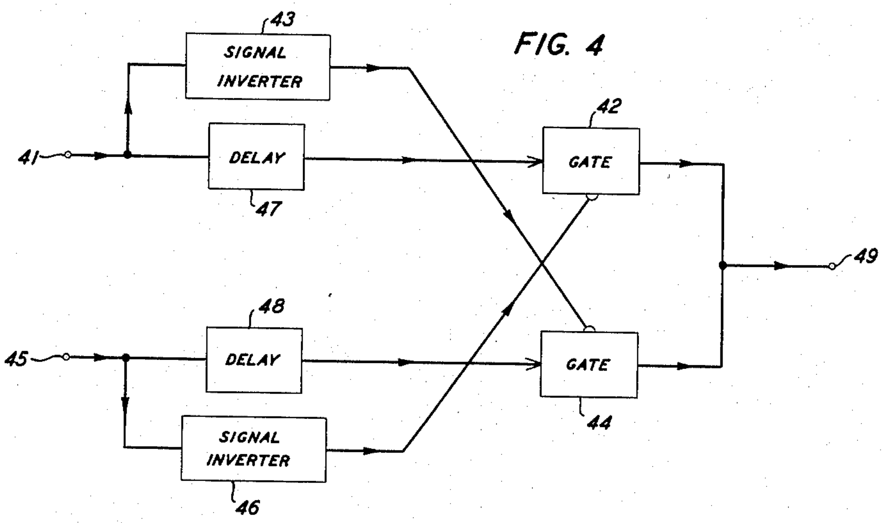
Fig. 4 is a block schematic diagram of an anti-coincidence switching type gate.

The basic unit for such a gate is the gate shown in Fig. 2 which has one enabling control and one inhibiting control. Two such gates are used with their outputs connected together. (The schematic representation of enabling and inhibiting inputs as used in Figs. 4, 5, 7 and 8 may be understood by reference to Fig. 9.) Referring to Fig. 4, a control signal applied to input 41 enables gate 42 but also, inverted by the signal inverter 43, inhibits gate 44. Likewise, a control signal applied to input 45 enables gate 44 and, inverted by signal inverter 46, inhibits gate 42. Delay elements 47 and 48 introduce delay equal to the delay of the signal inverters 43 and 46 in the inputs to the enabling controls of gates 42 and 44, respectively, to prevent an input signal from reaching the common output before a coincident signal on the other input has time to inhibit the gate to which the input is applied. Thus, either signal by itself produces an output but the two together block each other. This obviously assumes such accurate coincidence of the control pulses that no pulse can produce an output before the gate to which it is applied is inhibited by a coincident pulse.

Figure 5:
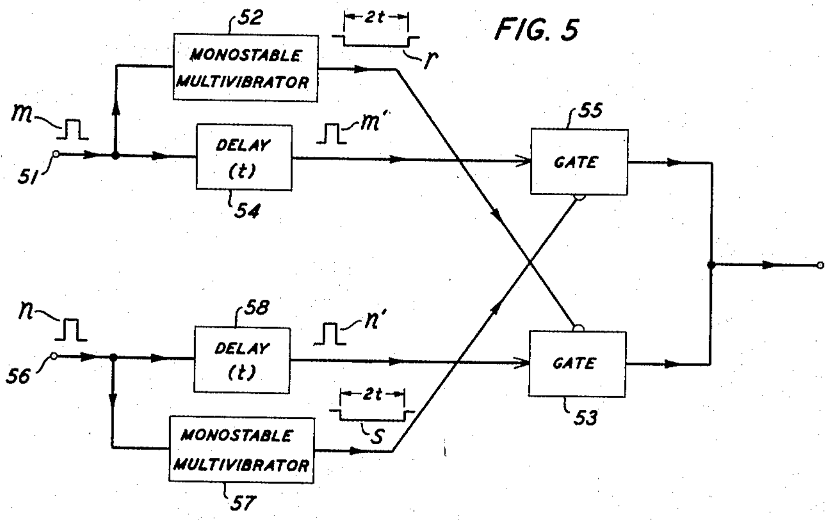
Fig. 5 is a block schematic diagram of an anti-coincidence gate adapted to prevent false operation due to slightly inaccurate timing of the input pulses and the wave forms of Fig. 6 illustrate the timing of the pulses in the circuit of Fig. 5.
Figure 6:
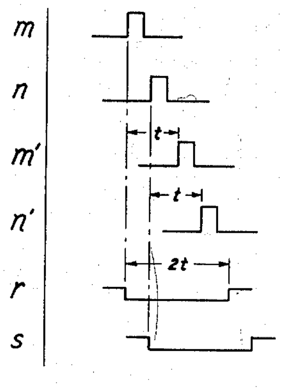
Figure 7:
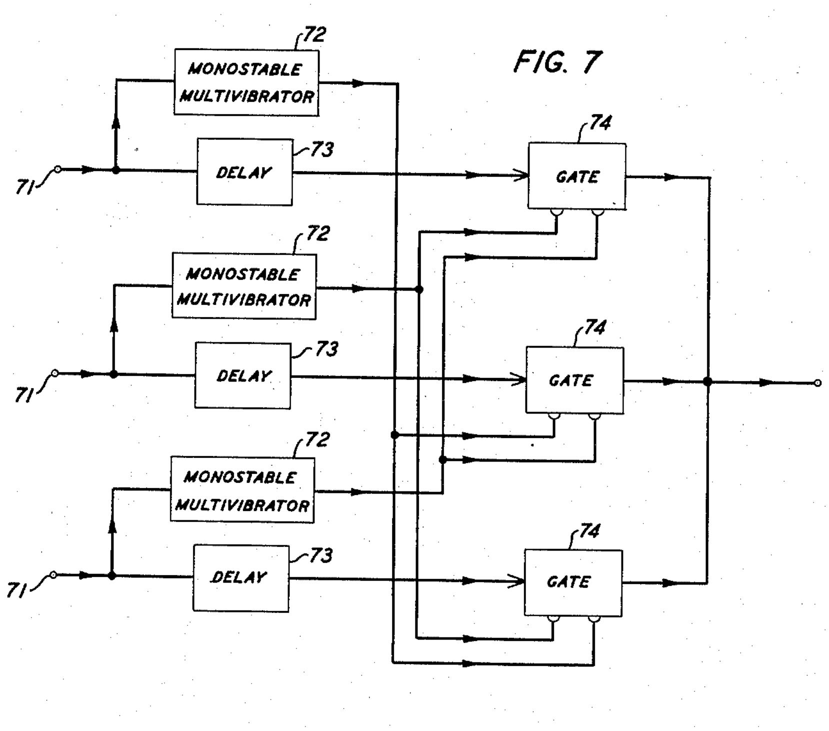
Fig. 7 illustrates, by block diagram, an extension of the principles embodied in the circuit of Fig. 5 to a three control gate.

Since this high precision of coincidence is difficult to obtain in many applications, there is shown in Fig. 5 a circuit which defines its own coincidence interval and produces no output when the signal inputs are within the defined interval. Referring to Fig. 4, a control signal *m* applied to input 51 is impressed on a pulse producing source comprising the monostable or single-trip multivibrator 52 which, when triggered, delivers an output pulse *r* of the opposite polarity of the input pulse and of a duration equal to 2*t*. The pulse produced by multivibrator 52 is impressed on the inhibiting control of gate 53. Signal *m* is also passed through a delay network 54 which delays it a time *t* and impresses it on the enabling control of gate 55. A control signal *n*, applied to input 56 is similarly impressed on a monostable multivibrator 57, which, when triggered, produces an output pulse *s* of duration 2*t*, and on a delay network 58. The time sequence of the pulses in the circuit is illustrated in Fig. 6. A study of this figure will show that the "coincidence" interval defined by the anti-coincidence gate of Fig. 5 is of duration *t* and if the time interval between any two signals on opposite inputs is less than time *t*, they will effectively block each other.

The principle of the invention illustrated by the circuit of Fig. 5 may be applied to an anti-coincidence circuit having more than two inputs. For example, the circuit of Fig. 7 will produce an output if an enabling signal is impressed on any one of the three inputs 71 but no output in the absence of an input or upon the presence of signals at any two inputs within the "coincidence" time interval defined by the multivibrators 72 and delay networks 73. It may be seen that a signal on any input enables its own gate 74, after a delay determined by its delay network 73, and also inhibits the other two gates for a period equal to the duration of the pulse produced by its associated multivibrator 72.

Figure 8:
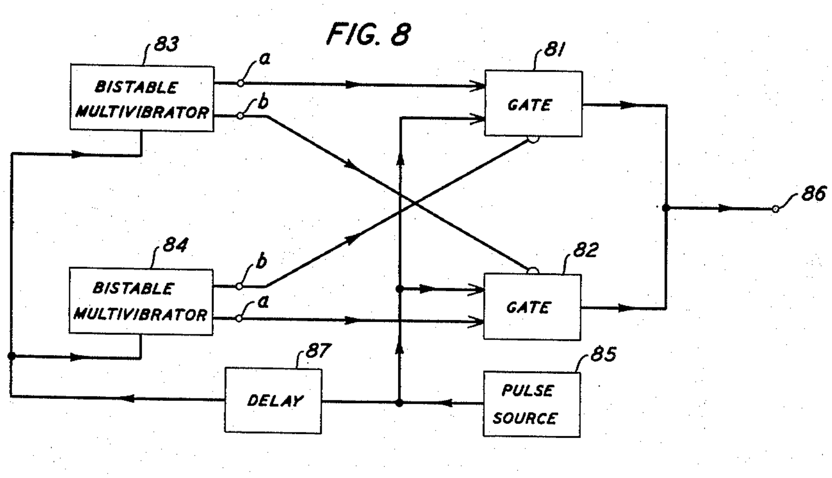
Fig. 8 illustrates, by block diagram, a modification of the circuit of Fig. 4 adapted for use with a shift pulse register.
Figure 9:
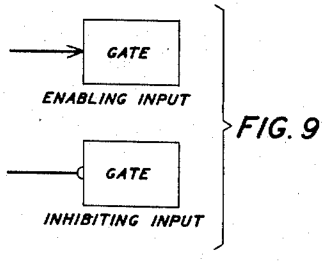
Fig. 9 illustrates the schematic representation of enabling and inhibiting inputs as used in the present drawings.

When the operation of the system is under the control of a pulse source, for example, the shift pulse source in a shift pulse register, the circuit may be modified as shown in Fig. 8. The basic unit of this anti-coincidence gate is a switching type gate having two enabling controls and one inhibiting control. For either of the elemental gates 81 and 82 to produce an output, there must be signals present on both of the enabling controls and no inhibiting signal present. The multivibrators 83 and 84 are in this instance symmetrical bistable devices ("flip-flops"). This type of unit is well-known and presents, at two terminals, potentials of different polarities, one of which can be used for enabling one control of a gate and the other for simultaneously inhibiting another gate. Devices 83 and 84 are not necessarily multivibrators but may be any storage unit which presents at two terminals, potentials of opposite polarity. For the present discussion, it will be assumed that the enabling signals are positive pulses and the inhibiting signals negative pulses. Therefore, if a negative pulse is applied to an enabling input, or, a positive pulse to an inhibiting input, they will have no effect.

The multivibrators 83 and 84 are assumed to be initially set to produce the desired potentials at their respective terminals *a* and *b*. The sequence of operations is then as follows:

A positive pulse from source 85, which may be a shift pulse source, is impressed on one enabling control of each elemental gate 81 and 82. If there is no signal present, that is, if terminal *a* of both multivibrators is negative, neither gate 81 or 82 has its second enabling control activated so there is no output. If there are two signals present, both terminal *a*'s are positive but both terminal *b*'s are negative so that gates 81 and 82 are both inhibited. When only one signal is present, one gate will be inhibited but the other will be completely enabled and produce an output signal which will appear at output terminal 86. After a non-critical delay, determined by delay network 87, which is sufficient to permit the shift pulse to disappear from the enabling inputs of gates 81 and 82, the delayed pulse from source 85 operates to set up the next pair of signals on multivibrators 83 and 84.

The mulvibrators 83 and 84 may be the output units of shift registers which are operated by the shift pulse, or, the shift pulse may enable gates to let the next pair of signals operate the multivibrators. In the case of synchronous operation, the multivibrators would be reset by the next pair of signals without the aid of a shift pulse. Shift registers are described in a book entitled "High Speed Computing Devices" by the Engineering Research Association, McGraw Hill, 1950 and particularly at pages 297 and 298.

Although the invention has been described as relating to specific embodiments, numerous other embodiments and modifications are within the scope of the invention and will readily occur to one skilled in the art. The invention, therefore, should not be deemed limited to the specific embodiments disclosed above.

What is claimed is:

1. An anti-coincidence circuit having a first and a second input for applying signals, a first and a second elemental gate each having an enabling control and an inhibiting control, means connecting said first and second inputs to the enabling controls of said first and second elemental gates respectively, means to delay the signals applied to said enabling controls by a time *t*, a first and a second pulse producing means each adapted to produce, when triggered, a pulse of duration 2*t*, means also connecting said first and second inputs to the inputs of said first and second pulse producing means respectively, means connecting the outputs of said first and second pulse producing means to the inhibiting controls of said second and first elemental gates respectively, and means connecting together the outputs of said elemental gates.

2. The combination with an anti-coincidence circuit having two inputs to apply signals, a first and a second elemental gate each having an enabling control and an inhibiting control, means to impress signals applied to each input to the enabling control of one gate and the inhibiting control of the other gate, and means connecting together the outputs of said elemental gates, of means to define a nominal coincidence interval which comprises means to delay the signals applied to said enabling inputs by a time substantially equal to said interval, and means associated with each of said inputs responsive to the receipt of a signal at its associated input to apply an inhibiting signal of duration substantially equal to twice said interval to the inhibiting control of the gate other than the one to whose enabling control is applied the signal which was responsible for said inhibiting signal.

3. The combination in accordance with claim 2 wherein said last-named means comprise a first and a second monostable multivibrator.

4. An anti-coincidence circuit having a plurality of inputs to which signals may be applied and a common output which is adapted to produce an output signal only when input signals are at any one time applied to only one input which comprises a plurality of elemental gates each having an enabling control and a plurality of inhibiting controls, means to apply signals at each of said inputs to the enabling control of one of said elemental gates and to an inhibiting control of each of the other gates, and means connecting together the outputs of said elemental gates.

5. An anti-coincidence circuit having a plurality of inputs for applying signals and a common output which is adapted to produce an output signal only when a signal is applied to any one input and when no signal is applied to any other input within a defined time interval including the time said signal is applied, said circuit comprising a plurality of elemental gates each having an enabling control and a plurality of inhibiting controls, means to apply the signals applied to each input to the enabling control of one of said elemental gates, means to delay the signals applied to the said enabling controls of said elemental gates by a time substantially equal to said defined interval, a plurality of means each connected to one of said inputs and adapted to produce, when triggered by an input signal, an inhibiting signal of duration substantially equal to twice said defined interval, means to apply said inhibiting signals to an inhibiting control of each of said gates other than the one to whose enabling control is applied the input signal which triggered the inhibiting signal producing means, and means connecting together the outputs of said elemental gates.

6. In combination, a first and a second energy-storing device each having two output terminals, a first and a second gate each having two enabling controls and an inhibiting control, means connecting a first terminal of each of said storage devices to an enabling control of one of said gates and the other terminal of each of said storage devices to the inhibiting control of the other gate than the one to which its first terminal is connected, a source of pulses and means to apply said pulses to the remaining enabling control of each of said gates.

7. The combination in accordance with claim 6 and means to adjust the potentials on the terminals of said storage devices, means to also apply said pulses to said storage means to alter said adjustment, and means to delay the pulses applied to said adjusting means by an amount equal at least to the duration of the pulses at the enabling controls to which they are applied.

8. The combination in accordance with claim 6 wherein each of said energy-storing devices produce at their two terminals potentials of opposite polarity.

9. A circuit having a plurality of inputs and a common output adapted to block the signals applied to certain inputs if, within a given time interval, signals are also applied to certain other inputs, said circuit comprising gating means connecting each of said inputs to said output, means to delay the signals applied to said gating means by an amount substantially equal to said given interval, signal producing means connected to each of said inputs and adapted to produce in response to an applied signal an output signal having a duration substantially equal to twice said given interval, and means to apply the said output signals produced in response to signals at said certain other inputs to disable the gates connecting said certain inputs to said common output.

LUTHER W. HUSSEY.

References Cited in the file of this patent

UNITED STATES PATENTS

| Number | Name | Date |
|---|---|---|
| 2,476,066 | Rochester | July 12, 1949 |
| 2,556,200 | Lesti | June 12, 1951 |
| 2,557,729 | Eckert, Jr. | June 19, 1951 |